United States Patent [19]
Sleeter et al.

[11] Patent Number: 5,942,058
[45] Date of Patent: *Aug. 24, 1999

[54] CO-ADHESIVE SYSTEM FOR BONDING WOOD, FIBERS, OR AGRICULTURE BASED COMPOSITE MATERIALS

[75] Inventors: Ronald T. Sleeter, Decatur, Ill.; Kenneth D. Roos, St. Peter, Minn.

[73] Assignee: Archer Daniels Midland Company, Decatur, Ill.

[ * ] Notice: This patent is subject to a terminal disclaimer.

[21] Appl. No.: 08/679,014

[22] Filed: Jul. 12, 1996

Related U.S. Application Data

[63] Continuation-in-part of application No. 08/402,109, Mar. 10, 1995, abandoned, application No. 08/472,919, Jun. 7, 1995, Pat. No. 5,719,301, and application No. 08/502,167, Jul. 13, 1995, Pat. No. 5,607,633

[60] Provisional application No. 60/007,405, Nov. 21, 1995.

[51] Int. Cl.$^6$ .............................. B27N 3/02; B27N 3/04; B27N 3/12; B27N 3/14
[52] U.S. Cl. ..................... 156/62.2; 156/296; 156/312; 156/331.4; 156/335; 264/108; 264/109
[58] Field of Search .................................. 156/62.2, 335, 156/331.4, 312, 296; 264/109, 108, 113; 428/326, 109, 106, 114

[56] References Cited

U.S. PATENT DOCUMENTS

| | | |
|---|---|---|
| 3,984,444 | 10/1976 | Ritz et al. . |
| 4,082,708 | 4/1978 | Mehta . |
| 4,337,710 | 7/1982 | Haataja et al. . |
| 4,609,693 | 9/1986 | Schols et al. . |
| 4,740,575 | 4/1988 | Nguyen et al. . |
| 4,752,637 | 6/1988 | Israel . |
| 5,607,633 | 3/1997 | Sleeter et al. . |

*Primary Examiner*—Sam Chuan Yao
*Attorney, Agent, or Firm*—Laff, Whitesel, Conte & Saret, Ltd.

[57] ABSTRACT

The invention provides an adhesive system comprising a blend of resin and a co-adhesive conjugated triglyceride drying oil acting as a internal release agent which is mixed with fibers for bonding composite panels such as oriented strand board, particle board, plywood, MDF, hardboard, and similar panels. The resin is a fast acting bonding material which forms a mat of fibers into a self sustaining panel within a time limit during which a press may be economically utilized. The triglyceride acts slower so that, after the panel is formed, there is enough time to penetrate the fibers to a depth that results in a superior bonding. The conjugated drying oil is a release agent that provides an internal release agent that prevents the composite panel from sticking to the press that bonds it.

11 Claims, No Drawings

CO-ADHESIVE SYSTEM FOR BONDING WOOD, FIBERS, OR AGRICULTURE BASED COMPOSITE MATERIALS

This application claims the benefit of U.S. provisional application Ser. No. 60/007,405, filed Nov. 21, 1995 and is a continuation-in-part of Ser. No. 08/402,109, filed Mar. 10, 1995 now abandoned and Ser. No. 08/472,919, filed Jun. 7, 1995 now U.S. Pat. No. 5,719,301 and Ser. No. 08/502,167, filed Jul. 13, 1995 now U.S. Pat. No. 5,607,633.

This invention relates to an adhesive system especially—but not exclusively—for bonding various wood, wood chip, fiber, and agriculture based composite based materials and more particularly—but again not exclusively—to means for and methods of making a new and improved composite boards such as particle board, plywood, oriented strand board, medium density fiberboard, hardboard, structural strand lumber, or the like, and still more particularly to adhesive systems with an internal release mechanism which facilitates a removal of the composite board from a hot press.

The patent application Ser. No. 08/472,919, filed Jun. 7, 1995, describes the co-adhesive system, per se, which is used as described herein. This co-adhesive system could be used in conjunction with fast setting resins, such as PF, UF, melamine, aromatic isocyanate resins, or a combination of these resins. The inventive system enables a production mill to reduce both overall resin cost and VOC emissions, and to diminish maintenance on operations equipment. "Drying oils" include conjugated oils.

The term "conjugation" is used herein to describe triglycerides which have double bonds on adjacent carbon atoms. Text material on drying oils is found in Bailey's Fats and Oils, Ch. 10.

Some examples of slow setting drying oils are: linseed, fish, soybean, tall, tung, castor and oiticica. Drying oils are triglycerides composed of fatty acids which have a preponderance of two or three double bonds. The drying ability of these oils is related to their Iodine Value ("IV"), which is a quantitative measure of the number of double bonds that they contain. Oils in the range of 195–170 IV are relatively fast-drying.

Oils in the range of 140–120 IV are semi-drying, and oils with IV's under 120 are non-drying.

For natural oils containing more than one carbon to carbon double bond, the double bonds are generally separated by a methylene group, commonly referred to as being "methylene interrupted". The methylene interruption limits their use in industrial polymerization applications, where they could find use as coatings, adhesives and the like. For these fats and oils to be so used industrially, they need to polymerize rapidly. For this to occur, it is advantageous to have the double bonds adjacent to one another or "conjugated" (i.e., the methylene interrupt is shifted or relocated).

A simple explanation of this methylene interrupt shift is illustrated by the following example showing only carbon atoms:

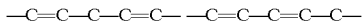

The carbon chain on the left is methylene interrupted between the two carbon atoms having double bonds. The carbon chain on the right is conjugated by shifting the methylene group from the center to the end of the chain of carbon atoms.

Over the years, many methods have been developed to produce conjugated oils by shifting the methylene interruption between the double bonds. Unfortunately, due to their expense and other limitations, only limited commercial amounts of such modified vegetable oils have been produced using these methods.

One example of such a drying oil or catalytic bonding material is found in European Patent Application No. 0 040 577, dated May 14, 1981, opened to the public Nov. 25, 1981, Georges Cecchi and Eugene Ucciani, inventors. However, it has been found that the ruthenium on carbon, as practiced by Cecchi and Ucciani in the European Patent Application No. 0 040 577, was not capable of reuse as claimed. It is critical for a process of this nature to be capable of numerous reuses due to the expense of the catalyst. Catalyst activity for used catalyst of this patent is reduced by a factor of one-half for every reuse, when used for conjugation of linseed oil. Typical conversions start at 85% conjugation for the first reaction, about 40% conjugation for the second reaction with the catalyst used once, and about 20% conjugation for the third reaction with the catalyst used twice. Therefore, for practical commercial products, the Cecchi-Ucciani procedure leads to a prohibitively high cost to make conjugated oil, primarily due to the loss of catalyst activity. Thus, the use of ruthenium on carbon alone is not a viable process.

One other study, by A. Basu, S. Bhaduri and K. R. Sharma, "Metal clusters in Homogeneous Catalysis: Isomerization of Methyl Linoleate", Adv. Catal. (Proc. Natl. Symp. Catal.) 7th, 1985, describes the reaction of tetracarbonyl triruthenium and other compounds from a reaction standpoint. The catalysts are added at a nearly equivalent basis. Using the teachings of this work in a practical commercial process to manufacture conjugated oils would result in a level of consumption of ruthenium which would be intolerably high and prohibitively expensive.

Linseed oil is the first choice drying oil for use in the invention due to its high levels of unsaturation (IV= 155–205), especially of linolenic acid which generally exceeds 55% by weight. Soybean oil and safflower oil are two other candidates. However, they are generally considered less desirable because they have less total unsaturation with most of the unsaturated fatty acids in these oils being linoleic (IV=120–141 and 145 respectively).

Prior methods for the conjugation of double bonds in drying oil yield low conversions required long reaction times at high temperatures. The conjugation of the oil proceeds through an optimum yield of conversion at which point polymerization outpaces conjugation and the amount of conjugated oil actually decreases as the reaction proceeds. This ultimately produces an oil of such high viscosity as to render it useless for many applications.

Some of these procedures producing low levels of conjugation are represented in the following list:

| Catalyst | General Yield | Reference |
|---|---|---|
| Nickel/Carbon | 34% | Ind. and Eng. Chem. 997–1002 (1946), S. B. Radlove, H. M. Teeter, W. H. Bonds, J. C. Cowan and J. P. Kass |
| Primary Alcohols | 19% | U.S. Pat. No. 2,242,230 (May 20, 1941), George Burr |
| Aliphatic Organic Iodides | 30% | U.S. Pat. No. 2,422,112 (November 12, 1946), Anderson Ralston and Otto Turinsky |
| Inorganic Iodides | 24% | U.S. Pat. No. 2,411,113 (November 12, 1946), Anderson Ralston and Otto Turinsky |
| $SO_2$ | 11% | U.S. Pat. No. 3,278,567 |

-continued

| Catalyst | General Yield | Reference |
| --- | --- | --- |
| | | (October 11, 1966), Walter E. Ratjen, Lowell O. Cummings and John A. Kneeland |
| Sulfur Organics (Aryl Thiols) | 18% | U.S. Pat. No. 3,784,537 (January 8, 1974); U.S. Pat. No 3,925,342 (December 9, 1975), Roland Pierre and Franz Scharrer |
| Amine Hydroiodides | 37% | U.S. Pat. No. 2,411,111 (November 12, 1946), Anderson W. Ralston and Otto Turinsky |
| $SOCl_2$ (of esters) | Small | Yukagaku 1970, 153–7 Hisako Shiina and Tetsutaro Hashimoto |
| Anthraquinone | 19% | JAOCS 237–243 (1948), L. B. Falkenburg, Wm. DeJong, D.P. Handke and S. B. Radlove |
| Alkali (of esters) | 50% Range | G. S. R. Sastry, B. G. K. Murthy, J. S. Aggarwal, Paint Manufacturing 32–4 (1970) |
| Alkali (Potassium T-Butoxide) | 38% | B. S. Sreenivasan and J. B. Brown, JAOCS 35 89–92 (1958) |
| Iodine | 40% | Yukagaku 28 600–604 (1979), Yasuhiko Kubota and Tetsutaro Hashimoto |
| Hydrosilicones with metal catalyst | 60% | U.S. Pat. No. 3,449,384, Hans Ender |
| Dehydration of Caster Oil | 50% + | Ind. Eng. Chem., Prod. Res. Dev., 16 107–111 (1977) |

There are several methods which have produced high levels of conjugation without concomitant polymerization. These reactions are fairly efficient and produce highly conjugated products with significantly less polymerization. Thus, these oils are quite fluid. Some of these methods are described in the following documents:

| Catalyst | General Yield | Reference |
| --- | --- | --- |
| Chromium Carbonyls | 45–65% | JAOCS 47, 33–36 (1969), E. N. Frankel |
| Iron Pentacarbonyl | 95% | JAOCS 44, 37–9 (1967), U.S. Pat. No. 3,373,175, U.S. Pat. No. 3,392,177, E. N. Frankel |
| Rhodium/Iridium organometallic complexes | 50% + | European Patent EP 0 160 544, A. Basu, Sumit Bhaduri and T. K. G. Kasar |
| Ruthenium on Carbon | 80% + | European Patent EP 0 040 577, Georges Cecchi and Eugene Ucciani |
| Rhodium/Ruthenium organochlorin complexes | 80% + | German Patent 2 049 937 Helmut Singer, Werner Stein and Herbert Lepper |

Most of the prior methods described in the foregoing documents have significant drawbacks. The carbonyls are highly toxic and very difficult to work with. Iron pentacarbonyl is flammable at room temperature. The reaction requires a high pressure vessel capable of withstanding 1500 PSI and 200° C. Recovery of the iron pentacarbonyl is very slow and a significant loss of unrecovered catalyst into the oil makes it an uneconomical process. Organo-rhodium and organo-iridium catalysts are very expensive beginning with the purchase price of the metal prior to the added expense of synthesis of the organocomplex. These reactions require 12 hour reaction times and substantial amounts of catalyst. Although the catalyst has been reported to be recovered in good yield by using a non-polar solvent, this comes at an additional processing cost, along with the danger of the use of flammable solvents. Furthermore, the amount of residual catalyst remaining in the oil following the recovery step has not been determined, but it is thought to be too high to make the process economical.

Plant life gives off volatile organic compounds ("VOC") which are atmospheric pollutants. In the wild, VOC's tend to be unimportant and it would be very rare, if at all, that natural VOC's would create a problem. However, in the manufacture of certain products based on plant life, there can be a concentration of VOC's which become a serious pollutant. Federal, state and local regulations severely limit the release of VOC's; see, for example, the EPA Clean Air Act.

Wood is one of the world's most significant renewable resources. However, since the world's supply of large diameter trees for producing lumber and plywood products is decreasing, modern technology is trying to extend the dwindling forest resources. Hence, the production of plywood and other wood composites, including particle board, using adhesives as binder, has increased substantially during the last 50 years. The remainder of this specification will focus on oriented strand boards "OSB", by way of example; however, this concentration on OSB is for convenience of this description and does not limit the invention thereto. Quite the contrary, the invention is applicable to at least plywood, particle board, OSB and all similar boards.

In order to make OSB, bark is first stripped from logs. Then, the debarked logs are cut into suitable lengths and fed into a flaker where they are reduced into thin flakes which are fractured to produce narrow, thin strands of wood. These wood strands are dried to reduce their moisture content from roughly 50 percent to about 5 percent of the total mass.

Next, the dried strands are blended with a suitable petroleum based "slack" wax or emulsion and a liquid or dry resin which is a glue that binds the strands together later in the manufacturing process. Regardless of the composite, the wood fibers, chips and fillers are usually bonded with phenolic resins, polymeric methylene diphenyl diisocyanates, protein glues, etc. The petroleum based wax helps repel water in the finished flake board.

The strands are formed into mats with the strands oriented so that the strands of one layer lie crosswise over the strands of the next neighboring layer. The result is a five-layer, for example, mat of cross-oriented strands which is several inches thick. Thereafter, the strand-laden sheets are loaded into a press where heat and pressure are applied simultaneously in order to compress the mat to desired thickness and activate the resin, thereby bonding the strands into structural flake board panels.

One of the more troublesome problems which has been encountered is that of releasing the mat when the press is opened. There has sometimes been a tendency for the particles of wood to adhere to structural elements of the press so that, at a minimum, they are torn from the panel and at a maximum the panel is not usable. Hence, there is a need for a release agent which would prevent the mat from sticking to the press.

One way of providing a release agent involves a use of valves for spraying an external release agent on the exposed surfaces of the mat, but this involves added steps making a more costly manufacturing process. A better way is to include an internal release agent in the wood fiber bonding material so that there is almost no added expense other than the cost of the release agent, per se.

Adhesives currently used by manufacturers of various wood composition based panels include urea-, phenol-, melamie-urea and melamine-formaldehyde, and polymeric isocyanate ("UF", "PF", "MUF", "MF", and "PMDI").

However, manufacturers of composite panels continue to search for supplements to or replacements for adhesives presently used, especially those which are based on urea- and phenol-formaldehyde adhesives, because of environmental and health concerns. Primarily the effort is to reduce or eliminate the emitted amount of free formaldehyde, especially the emissions resulting from consolidating mats of resin-coated particles under heat and pressure.

Isocyanates are one of the adhesives which are currently used as an alternative to the environmentally unfriendly adhesives. Even though somewhat better than prior adhesives, the isocyanates are not entirely free of health risks. The isocyanates can react with moisture on the skin or with moisture in the lungs if inhaled as atomized isocyanate or isocyanate-coated wood dust. Also, isocyanates can cause manufacturing problems since they can bond to metals (i.e., metal plates and presses) and can have a considerably shorter open time on the stands than UF or PF. Isocyanates may be more expensive than other conventional adhesives.

More information on suitable adhesives can be found in articles in the publication "Adhesives Age" for May 1981 (pages 41–44) and October 1992 (pages 22–25).

Before adopting a new bonding material, at least four major factors should be considered:

1) ease of formulation and application of the bonding material,
2) effect on the physical properties of the board,
3) effect on the environment and human health, and
4) the relative costs of alternative materials.

SUMMARY OF THE INVENTION

Accordingly, an object of this invention is to provide new and improved adhesive materials having a widespread use, especially—but not exclusively—as adhesives used to manufacture OSB, particle board, plywood, or the like. In particular, an object is to provide composite panels which have an increased inner bond strength and are less prone to tearing, swelling or delaminating.

In keeping with an aspect of the invention, a first co-adhesive system has an amount of conventional adhesive that is used to quickly form the fibrous mat into a bonded board or panel. A second co-adhesive is an amount of conjugated triglyceride or drying oils which is added to provide a release agent and to penetrate the wood fibers of the bonded board or panel over an extended drying time, thereby enhancing the bonding strength as compared to the strength of the adhesive system using only a resin alone.

In general, the cost of the inventive product made with the inventive co-adhesives is significantly less than the cost of the material which it replaces. Also, the co-adhesives may be upgraded to produce products with specifications which cannot otherwise be produced without resorting to adhesives of much greater expense. As well, the inventive co-adhesives have much reduced VOC's.

DETAILED DESCRIPTION

The inventive system uses a bonding agent having release properties based slow setting conjugated triglyceride, such as a preferred modified linseed oil containing amounts of linolenic acid, which are a portion in the order of 5% or higher of the total linseed oil. Other unsaturated and slow setting triglycerides containing high amounts of linoleic acid may also be utilized, but are not necessarily preferred, such as: soybean oil, China wood oil or tung oil, tall oil, castor oil, oiticica oil, various fish oils and the like.

Most organo-ruthenium complexes, ruthenium salts and, to a limited degree, ruthenium covalent compounds and ruthenium salts in which ruthenium is in any of its several valence or oxidation states, catalyze the conjugation of methylene interrupted double bonds in common vegetable oils. Most compounds of ruthenium which can be solubilized into the substrate (oils with high Iodine Values composed of methylene interrupted double bonds) are or form active homogeneous catalysts to conjugate double bonds. Indeed, organic compounds in general which have methylene interrupted double bonds can be conjugated with the process of this invention.

The successful use of these forms of ruthenium depends upon the presence of an acid during the reaction. The preferred acid is formic acid. Some other acids such as organic acids (e.g., acetic, benzoic, oxalic) or HCl (in gaseous form) and also some low molecular weight alcohols (e.g., methanol, ethanol and isopropyl alcohol) work with ruthenium, but to a much lesser degree.

Also, combinations of these acids, such as formic acid and HCl (gaseous), may be used. In addition, surprisingly low levels of ruthenium of the order of 10–20 ppm can achieve in excess of 80% conversion to conjugation. These catalysts can be used at any level, although the conversion of methylene interrupted double bonds to conjugated double bonds decreases in efficiency as lower and lower levels of catalyst are used based on ruthenium content. Thus, the level of ruthenium as metal should be at least about 5 ppm and not more than about 200 ppm, based on the weight of the oil being treated.

A level of about 10–50 ppm ruthenium is preferred and a level of about 10–20 ppm is most preferred. The level of acid should be not more than about 4 percent by weight, based on the weight of the oil being treated, with the lower end being determined on a case-by-case basis. The preferred level of acid will be about 0.8 to 2.4 percent by weight.

Finally, the reaction should be carried out in the absence of any significant amounts of oxygen. Thus, common vegetable oils such as linseed oil may, in accordance with the invention, be conjugated efficiently and economically to produce modified oils having unique drying properties.

The criteria for the oil substrate is that a significant amount of unsaturated fatty acid triglycerides (such as linolenic, linoleic, eicosapentanoic, etc.) are present which have conjugatable double bonds. This oil is then conjugated by using any of several methods which may be chosen based on an optimization of yield and production costs for the conversion. Some examples of the inventive methods of conjugation are based on a use of one or more of the following catalysts: ruthenium, SO2, amine hydroiodides, primary alcohols, alkali, anthraquinone, nickel/carbon, and others.

ADHESIVE

The conjugated triglyceride product may then be blended with a triglyceride such as one which has been hardened by hydrogenation to produce a very hard fat with a high melting point; examples of which would be soy stearin, cotton seed stearin, and palm oil stearin. A high melting point hydrocarbon wax may also be used as a blending agent. One preferred example of a high melting hydrocarbon is a petroleum byproduct known as petroleum based slack wax or emulsion waxes. The hard fat and wax with a high melting point are almost equally effective. The choice of which to use depends largely upon cost and possible detrimental disadvantages such as increased volatility, etc.

For an analysis of the extent of reaction, the disappearance of linoleic and linoleic acids is monitored by gas liquid chromatography ("GLC"). For convenience, the conjugation yield is then calculated as a percentage loss of linolenic acid. For example, typically pure unreacted linseed oil is analyzed at 58.4% linolenic acid by GLC. A reaction which resulted in a 20.0% linolenic acid is referred to as having a 65.8% conjugation.

(1−20.0/58.4×100)=65.8

This calculation is an over simplification because not all of the generated compounds are conjugated. Furthermore, polymerization can occur and these compounds are "counted" as being conjugated oil under this simplified analysis regime.

A second analytical method has been developed for analyzing the extent of reaction. This method employs a use of the Fourier Transform Infrared Spectrophotometry ("FTIR"). The peak monitored is in the 945–990 cm-1 wavelength band which is specific for trans and conjugated isomers.

Stated another way, a way was discovered to use many forms and states of ruthenium in micro amounts in order to catalyze this reaction in the presence of acid. Ruthenium is a unique metal capable of forming many diverse compounds and complexes. A 1373 page treatise, The Chemistry of Ruthenium, by Seddon and Seddon, Elsevier Science Publishers, New York, 1984, attests to this fact.

Examples of useful ruthenium complexes are dodecacarbonyl triruthenium, dichlorotris(triphenylphosphene) ruthenium (II) and ruthenium (III) 2,4-pentanedionate. An example of a useful ruthenium salt is ruthenium (III) chloride hydrate which is particularly preferred in the practice of this invention. An example of a covalent compound is ruthenium dioxide. Optimally, it has been found for dodecacarbonyl triruthenium, a 50 ppm ruthenium basis amount of catalyst converted linseed oil to 75% conjugated linolenic acid and 26-conjugated linoleic acid product with a reaction temperature of 180° C. and a reaction time of 1 hour. With the triphenylphosphene, reaction of the methylene interrupted double bonds had somewhat increased selectivity forming a greater proportion of trans isomers prior to proceeding to conjugation. It was intensely active, producing 85.3% conjugation of linolenic acid in three hours with 10 ppm ruthenium basis and 180° C. The pentanedionate gave a conjugation of 50.7% at 20 ppm and 180° C.

It has been found in nearly all cases that when most forms of ruthenium are allowed to come into contact with the substrate under the reaction conditions, they will solubilize into the substrate as homogeneous catalysts or be converted into homogeneous catalysts. Solubilization and activation of the ruthenium is achieved optimally with the use of formic acid. The greatest success is achieved by the presentation of ruthenium to the substrate (linseed oil or organic compound) in a monomolecular form. Most organo-ruthenium complexes are soluble in the substrate allowing the dispersal of ruthenium in molecular form. The ruthenium, so dissolved, can then be further reacted and activated into highly active catalysts by formic acid and other acids and alcohols, as discussed above. The action of the formic acid is not fully understood at this time. It may act to reduce the ruthenium complex into dispersed metallic molecular ruthenium.

The only potential catalyst found not to work was ruthenocene, bis(cyclopentadienyl)ruthenium, which is a sandwich compound consisting of ruthenium between two cyclopentadiene rings. The ruthenium in this compound is fully enclosed between the cyclopentadiene rings. Thus, it is not accessible to promote catalysis and has no catalytic activity. Furthermore, ruthenocene was found to be too stable to react with formic acid in order to form an active catalyst under the conditions of reaction.

It is preferred to use ruthenium (III) chloride hydrate. This compound is preferred not only because of cost and availability, but also because no costly conversion to an organo-ruthenium complex is required. As an example, RuCl3-hydrate may be solubilized into linseed oil by prior solubilization into alcohols or organic acids such as methanol, ethanol or formic acid. The resulting RuCl3 solution can then be dispersed and eventually completely dissolved into solution. For example, only 20 ppm of ruthenium as RuCl3-hydrate was found to be needed to produce a conjugation of 85% of linseed oil. At this rate of usage, a commercially viable process is achievable because the cost of the loss of ruthenium is not prohibitive even if it is not recovered.

Another advantage gained with the present invention is the production of a product which does not need filtration or any other treatment prior to shipment for use. The color of the oil produced is very light.

In some cases antioxidants act to prolong catalyst life and synergistically help promote faster conjugation thereby enabling the efficient use of lower amounts of catalyst to achieve higher levels of conjugation which would not otherwise be achievable.

The following working examples are given to illustrate the wide range of successful ruthenium compounds which may be used. All of the following reactions were run under argon.

EXAMPLE ONE

Dodecacarbonyl triruthenium was added to refined and bleached linseed oil (in most examples the linseed oil was refined bleached or refined bleached and dewaxed) on a 50 ppm ruthenium basis [Ru=47.4% of $Ru_3(CO)_{12}$]. 0.026 grams of $Ru_3(CO)_{12}$ was added to 250 grams of linseed oil at room temperature. The reaction mixture was heated to 180° C. for a period of one hour. 2.2 grams of formic acid was added slowly throughout the reaction period in order to help catalyze the double bond migration. The product, analyzed by GLC, yielded a conjugated product with 75% C18-3 and 29% C18-2 conjugated. The reaction was allowed to continue to determine the full extent of conjugation that is achievable within a reasonable time. The conjugated C18-3 was 90% in three hours total reaction time. An additional 4.4 grams of formic acid was added by the end of the reaction.

EXAMPLE TWO

A reaction similar to the one above was run with 0.010 grams of $Ru_3(CO)_{12}$ (20 ppm Ru). The conversion for conjugated C18-3 was 55% in one hour, 66% in two hours and 73% in 3 hours. The conjugated C18-2 was 16.9% in one hour, 22.5% in two hours and 26.9% in three hours.

EXAMPLE THREE

A third reaction was run as above, but with 15 ppm Ru. The conjugation conversion was 47.6% conjugated C18-3 and 10.8 conjugated C18-2 during a three hour reaction.

EXAMPLE FOUR

A 5% ruthenium on carbon catalyst was used to produce a 75% conjugated linseed oil. The primary mode of the catalysis used is ruthenium in a monomolecular form, which is then solubilized into the oil to form a homogeneous catalyst. This was shown by taking the final product of this reaction containing 83.1 ppm Ru. This reaction mixture was diluted about one-to-one with fresh unconjugated linseed oil. The resultant mixture contained 29.5% conjugated C18-3 and 5.4% conjugated C18-2. This mixture was heated to 180° C. for one hour with the addition of 2.2 grams of formic acid over the reaction period. The final product was analyzed by GLC and found to have 48.3% conjugated C18-3 and 15.5% conjugated C18-2. This proved that the active form of the catalyst is soluble ruthenium metal acting as a homogeneous catalyst. Thus, it appears that almost any method of solubilizing ruthenium metal into a monomolecular form in the oil should work as a catalyst system.

EXAMPLE FIVE

Two reactions were run for three hours each with Dodecacarbonyl triruthenium (20 ppm ruthenium) at 180° C. One reaction had Tenox 20 added in the amount of 0.5%. Samples were taken hourly intervals. At each step, the reaction with the antioxidant out-performed the reaction without.

| Reaction | Percent C18-3 | Percent C18-2 |
| --- | --- | --- |
| 1 hr w/o antioxidant | 34.6 | 8.1 |
| 1 hr w antioxidant | 58.6 | 10.8 |
| 2 hr w/o antioxidant | 54.8 | 22.6 |
| 2 hr w antioxidant | 68.5 | 23.0 |

EXAMPLE SIX 250 grams of linseed oil were allowed to react with 20 ppm ruthenium as ruthenium dichlorotris (triphenylphosphene) with formic acid addition. Conversion of the linolenic acid was 82% in one hour and 97% in three hours. Linoleic acid conversion was 55% in one hour and 90% in three hours.

EXAMPLE SEVEN

A reaction similar to Example Six, using the triphenylphosphene, was run with 20 ppm of ruthenium with ruthenium 2,4-pentanedionate. Conjugation was not as high with 51% 8-3 in four hours.

EXAMPLE EIGHT

A preferred reaction was run with 20 ppm of ruthenium as ruthenium (III) chloride hydrate (assay of 41.0% Ru). The reaction temperature was 180° C. Formic acid was added a drop at a time to 250 grams of bleached linseed oil. Conversion to conjugated oil as measured by the disappearance of linolenic and linoleic acids was 61% C18-3 and 27% C18-2 in one half hour. Conjugation went to 88% for C18-3 and 51% for C18-2 in three hours.

Ideally, this preferred conjugated drying oil has a viscosity range so that it is pourable, pumpable, and sprayable at ambient temperature.

EXAMPLE NINE

Another preferred reaction with ruthenium (III) chloride similar to the preceding reaction was run with 10 ppm Ru. Conversion was 49% C18-3 and 14% C18-2 in four hours.

EXAMPLE TEN

A reaction was run during which formic acid was added to the reaction mixture at the beginning of the reaction and, additionally, HCl gas was bubbled in, initially and at hourly intervals. The ruthenium catalyst was solubilized from a carbon support. The HCl synergistically augmented the reaction so that it was 95% conjugated within a half hour and it started to polymerize after an hour reaction time.

Other organic acids work, but not as well as formic acid. Benzoic acid was substituted in a reaction with 20 ppm of Ru as $RuC_3$-hydrate and conjugation was only up to 35% C18-3 in four hours.

Alcohols work to some degree to catalyze the reaction, but with less efficiency than formic acid. Ethanol added a drop at a time over the reaction period, in a manner similar to the formic acid addition, produced a conjugation of 21% C18-3 in four hours using 20 ppm Ru as $RuCl_3$-hydrate.

EXAMPLE ELEVEN

As a control reaction, 250 grams of linseed oil, prebleached with bleaching earth, was allowed to react with 20 ppm ruthenium as $Ru_3(CO)_{12}$ at 180° C. for several hours under an argon atmosphere.

Experimental reactions were run by adding 0.1% by weight of conventional antioxidants. Generally improvement in activity was observed during the first hour of reaction after which the conjugation equalized.

Percent Conversion to Conjugation

| Reaction Time | Control | BHA | BHT |
| --- | --- | --- | --- |
| 1 Hour | 44.0 | 51.5 | 49.3 |
| 2 Hours | 58.6 | 57.9 | 53.4 |

A number of other ruthenium compounds were also studied for the catalyst activity that they could produce in conjugating double bonds in drying oils, primarily linseed oil. Primarily, the study was conducted on conjugation in linseed oil. These compounds were selected due to their commercial availability and because they represented a cross section of classes of such compounds. Tests were run on these compounds to show the wide diversity of molecular forms of ruthenium compounds which yield some catalytic activity following a loss of non-conjugated oil. For example, ruthenium triacetate represents the class of fatty acid or organic acid ruthenium salts. Ruthenium bromide is another compound which is representative of the halogen salts. The ammonium complexes of ruthenium are representative of nitrogen containing compounds. Other and more exotic and non-commercial compounds may be studied but it is presently thought that perhaps their expense might limit their practical use in many applications.

EXAMPLE TWELVE

All of the reactions in this example were run in the same manner in order to provide a comparison. Two hundred and fifty grams of bleached linseed oil were treated with each of the following catalysts on a 10 ppm ruthenium basis. The reaction was run at 180° C. for three hours under nitrogen in order to substantially eliminate or greatly reduce oxygen. One ml of formic acid was added at once as soon as the linseed oil reached 150° C. After the initial 1 ml portion was added, an additional 7 ml of formic acid was added a drop at a time during a remainder of the reaction time. During this working example, other ruthenium compounds that were tested for catalyst activity are:

(a) chloro pentaamine ruthenium (III) chloride, $[(NH_3)5RuCl]Cl_2$, produced 13% conjugation in three hours on a 10 ppm Ru basis;

(b) ruthenium triacetate, Ru(OAc)$_3$, caused 71% conjugation in three hours on an approximate 50 ppm basis;

(c) ammonium hexachlororuthenium (IV), (NH$_4$)$_2$ RuCl$_6$ resulted in 31.3% conjugation in three hours on a 10 ppm basis;

(d) potassium u-oxoopentachloro ruthenium (IV), K$_4$(RuCl$_5$)$_2$O caused 18.7% conjugation in three hours on a 10 ppm basis;

(e) cis-dichloro-bis (2, 2'-bipyridine) ruthenium (II), RuCl$_2$(ClOH$_8$N$_2$)XH$_2$O, produced 33% conjugation in three hours on a 10% ppm basis;

(f) ruthenium bromide hydrate caused 15.6% conjugation in three hours on a 10 ppm basis;

(g) ruthenium dioxide hydrate, RuO$_2$.H$_2$O, 11.1% conjugation in three hours on a 10 ppm basis;

(h) ruthenium nitrosyl nitrate, Ru(NO) (NO$_3$)$_3$, 55.1% conjugation on a 10 ppm basis;

(i) In addition, some other acids were studied for their effectiveness. Benzoic acid was used in place of formic acid, resulting in a 25% conjugation. Glacial acetic acid was tried and found to produce 23% conjugation. Oxalic acid produced 29% conjugation. All of these reactions with different acids were run on a 20 ppm basis of Ru; and (j) for comparison, 10 ppm of ruthenium as ruthenium (III) chloride hydrate (6.0 mg RuCl$_3$.2H$_2$O) dissolved in 3 ml of anhydrous ethanol was added to 250 g. of bleached linseed oil after heating to 240° C. The addition of 7 ml of formic acid a drop at a time during the reaction period of 3 hours at 180° C. produced a conjugation of 86.7%.

EXAMPLE THIRTEEN

Another example of a successful method of running a reaction as described in example twelve with ruthenium (III) chloride hydrate at 180° C. is as follows:

Mix ruthenium (III) chloride hydrate and water to make a 13% aqueous solution. This was used directly as catalyst for the reaction. The solution was added to 250 g of bleached linseed oil at room temperature using about 2 ml of ethanol to help rinse the last traces of solution into the oil. One ml of formic acid was added at 150° C. followed by an addition of 6 ml a drop at a time over the reaction period of 3 hours. The conjugation achieved was 77.1%.

The methods of examples twelve J and 13 were judged to be the easiest methods to best disperse and solubilize the ruthenium (III) chloride hydrate in the linseed oil.

EXAMPLE FOURTEEN

This example was run substantially as described in examples twelve to fourteen. Other dispersants of solubilizers were tried, such as glycerine and triglycerol mono oleate. These dispersants worked with conjugations of 36% and 14%, respectively, using 10 ppm RuCl$_3$ hydrate. But the end results were not as favorable as the end result of examples, which used ethanol.

EXAMPLE FIFTEEN

As an example of other oils which may be conjugated by using the process of example twelve, the most important from the standpoint of economics, availability, and favorable unsaturation is soybean oil. This oil was shown to conjugate to 82% by using 20 ppm ruthenium as a trichloride hydrate at 180° C. with 7ml of formic acid and 250 grams of refined and bleached soybean oil.

EXAMPLE SIXTEEN

Yet another example of other oils was also tried. A determination of enhanced drying was made when tung oil, a naturally occurring conjugated oil, was subjected to the same reaction conditions. The tung oil that was used had an alpha-eleostearic acid content of 73.8% prior to reaction. After a three hour reaction time using ruthenium (III) chloride hydrate on a 10 ppm ruthenium basis, similar to the reaction conditions mentioned above, 58.3% alpha-eleostearic acid remained unchanged. The other 21.0% was apparently rearranged to trans isomers. Later eluting peaks in the GLC analysis increased.

Composite Board Construction

The method used to apply the co-adhesive material onto the fibrous strands used in the composite boards may employ a spinning disc, air atomization, spray, or the like, depending primarily upon the form of the adhesive material and available equipment in the mill producing the board. A liquid form of the inventive co-adhesive material and wax could be used in the manner that slack waxes are used. An emission or suspension may be used by mills that are currently using a wax emulsion. A straight conjugated triglyceride oil solution could be supplied to mills as a co-adhesive that is premixed or mixed in line with the PF, UF, or isocyanate adhesive component. If they wish to do so, these mills may still use a petroleum based wax as a sizing agent.

The total processing time and pressure varies with the parameters of a given mat. For example, thicker mats may require longer press times and greater pressures.

EXAMPLE SEVENTEEN

Wood chips or another agriculture based composite material and the adhesive are blended in a blender rotating at 20–24 RPM. The adhesive is applied via a coil spinning disc atomizer operating in the range of approximately 10,000 to 14,000 RPM. The panel is pressed in a hot press heated to about 193° C. and closed to apply a pressure of about 525 PSI. At approximately 1 minute, pressure is reduced to holding pressure to "cook" the adhesive. At about 4.5 minutes, the press pressure is reduced to 0 PSI to degas the panel. The press is opened at about 5 minutes after it was closed.

The blended product enables an optimal incorporation of the adhesive system onto the wood fiber substrate and produces the best overall combination of wood panel properties. These wood panel properties include internal bonding, edge swell, linear expansion, modulus of rupture ("MOR") and modulus of elasticity ("MOE").

Since the conjugated triglyceride adhesive works in conjunction with almost all co-adhesives with nearly equal effectiveness, it acts independently of the chemical bonding of each different co-adhesive. For example, phenolic resins react with excess formaldehyde in a condensation reaction which polymerizes the molecules. On the other hand, the adhesive properties of the isocyanates are based on the reactivity of the NCO groups taking the form of urethane bridges with the hydroxyl groups of the cellulose of the wood.

It is theorized that an important additional advantage imparted by the present overall adhesive system is that it soaks into and penetrates the surface of agriculture based composites, such as a wood surface, for example. Thus, when the overall adhesive system polymerizes, it provides a greater depth of adhesion with a more thorough coating of the wood surface than would otherwise be afforded by the use of the resin co-adhesive alone.

A resin, or similar co-adhesive, is needed for making an initial and rapid bonding of the wood fibers in order to allow the triglyceride polymerization to continue bonding over a longer period of time. More particularly, conjugated oils, such as tung oil, and various bodied and boiled linseed oils have been used for their strength through oxidative polymerization in protective paints and coatings for wood surfaces. However, this form of oxidative polymerization requires longer lengths of time which are longer than used for wood bonding applications. Therefore, use of a fast acting co-adhesive is required.

The inventive adhesive system has many advantages. Since a triglyceride oil blend has no VOC's, the amount of VOC's produced is reduced by the proportion of the blend that is a triglyceride. Also, the addition of triglyceride to the formulation reduces the total amount of adhesive that is required to make the end product due to an apparent co-adhesive effect.

Also, the use of triglycerides facilitates an increased production without increasing the risk of stack fires. Another benefit of the triglyceride adhesive system is the added water protection since modified linseed, tung and other oils tend to be water repellent, which allows use of higher moisture content strands.

General Example Of Pressing Composite Boards, Especially Oriented Strand Board

A conjugated triglyceride oil is used as a co-adhesive in combination with a resin or adhesive for wood and wood chip applications including formed products, oriented strand board ("OSB"), particle board, plywood, medium density fiberboard and blended composites. The adhesive system may also be used in the manufacture of floor coverings such as linoleum and the like. A portion of the bonded product may include used plastics, paper, cardboard, and other virgin or recycled materials.

The conjugated triglyceride should have a conjugation in the range of 5 to 100% of the portion that is conjugatable, more preferably 50–100%, and most preferably 70–80%, with a high melting saturated triglyceride optionally added in a range from 2 to 95% of the total of oil and triglycerides present. It is preferred to use 20 to 35% high melting saturated triglycerides.

In the alternative, the conjugated triglyceride may be formulated with a high melting hydrocarbon in a range from 2 to 95%. The preferred range is from 25 to 30%. The high melting compound and the conjugated triglycerides may be added to the chips, in any order. The adhesive system may be further modified by chemically introducing additional functionality compatible with current adhesive systems. This addition may be in the range from 2 to 95%.

The conjugated triglyceride may additionally be blended from 1 to 100% with heat bodied or blown triglyceride oils of varying viscosity.

The co-adhesive may be taken from the following group:
Urea-Formaldehyde
Phenol-Formaldehyde
Melamine-Urea-Formaldehyde
Polyvinyl Acetate
Isocyanates
Resorcinol-Phenol-Formaldehyde
Protein
Tannin-Formaldehyde
Sulfite-Liquor One experimental production run produced the following results:

A. Materials used:
  1) Aspen Wood Strands
  2) Hercules 2100 P wax emulsion, from Hercules Corp. Minneapolis, Minn.
  3) Dyno 2461 Phenolic Resin, from Dyno Polymers, Virginia, Minn.
  4) Isocyanate Resin: MDI (Monomeric Diisocyanate)

B. Press Conditions:
  1) 400 degrees F platens metal pads
  2) 500 PSI press
  3) 30/60 seconds to close press to stops
  4) 175–200 PSI 30 seconds (holding pressure)
  5) 175 PSI 2½–3 minutes
  6) 1.5 minutes of degas C. Procedure Used:
  1) Blender
    Nest line blender rotating at 20 RPM
    70 lbs of wood strands
    Resin and wax added via a coil spinning disc atomizer at 12,000 RPM, ambient temperature.
  2) Orienter
    Chips oriented 50/50 face to core layer with a lab scale orienter. Target density for panel is 40 lbs. Panel size is 24×24½ inch thick.
  3) Press
    380 degrees F.
    525 PSI starting pressure
    175 PSI 1.5 minutes
    100 PSI 4.5 minutes
    0 PSI 5.0 minutes
    open press 5.5 minutes
  4) Hot Stack 24 hours.

D. Results:
  1) Density
  2) Edge Swell
  3) MOR
  4) MOE

The invention adds a second co-adhesive to the fast setting co-adhesive, resin or glue-like material. In this example, the fast setting co-adhesive is the PF and MDI. The second material is slow setting and based upon triglycerides which have a slower set up and polymerizing time. This combination of fast and slow set up times enables the fast acting co-adhesive to react at a quicker press time with a higher moisture strand. The slower reacting resins or glue-like co-adhesives take longer press times but are generally less expensive and more readily available to the market.

The co-adhesive adhesive system described above and sold commercially by the Archer Daniels Midland Company of Decatur Illinois under the trademark "ARCHER 1" gives the internal bond strength within a composite panel.

Release Agent

The invention mixes Archer #1 conjugated drying oil as a release agent into the adhesive bonding material in order to provide an internal release agent which enables an easier removal of the mat from the press.

Isocyanate resins react quicker and cure at lower temperatures than other types of resins. In greater detail, the use of isocyanate resins (MDI) in the manufacture of wood or agricultural based composites has many advantages. For example, when used as an adhesive, isocyanate resins produce extremely attractive mechanical properties in and better dimensional stability of composite panels verses the properties and stability produced by a use of other adhesives at a given resin loading. The quick set up enables faster press cycles when producing composite panels.

The MDI tolerates a higher moisture content furnish. In fact, it reacts with the water in the furnish; therefore, it reduces energy cost during the drying of the furnish.

Further, a use of MDI reduces stress levels within the composite panels after pressing. Isocyanate resins tolerate adverse bonding conditions better than other thermosetting adhesives used in the composite industry, which is a major issue in the production of agricultural based particle board.

Isocyanate resin does not contain any formaldehyde, which eliminates the potential for free formaldehyde off gassing once the composites are placed in service. These and other attributes make isocyanate resins a preferred choice over phenol formaldehyde and other resins for the production of composite panels.

The MDI does an excellent job bonding either wood or agricultural derived furnish together.

However, the tenacity of the resin to tolerate adverse bonding characteristics is one of the greatest obstacles to its expanded use in the composite industry. This excellent bonding capacity will also cause the furnish to adhere to the metal or aluminum platens and caul sheets used in the pressing of composite panels.

This adhesion to structures of the press raises a need for release agents for MDI resins. Less desirable, external release agents are those that are applied to the surface of the composite mats, screens, or platens. These release agents are relatively inexpensive and must be applied to the surfaces prior to each pressing. In an automated mill situation, the use of a mechanical spray equipment to apply the release agent is unreliable. Spray nozzles clog, hoses burst, and fluid runs dry; therefore, a thorough and even distribution of the release agent is not maintained. This leads to the furnish sticking to the platens, screens, or cauls.

More desirable, internal release agents are chemicals that are mixed with the MDI resin. While several of the companies making or selling isocyanate resin have manufactured excellent internal mold release agents, the incorporation of these materials into the furnish results in an overall cost increase for the resin. Some of these internal mold release agents also cause adverse effects on mechanical and physical panel properties when used at appropriate loadings which are required to achieve release.

In the past, raw linseed oil as been used has an external release agent with excellent results. However, when tried as an internal mold release agent, the raw linseed oil had severe negative impacts on both the mechanical and physical panel properties.

According to the invention, the modified linseed oil co-adhesive that is sold under the trademark Archer #1 was used for the manufacture of composite panels. To evaluate the ability of "Archer #1" coadhesive system for use as an internal mold release agent for MDI bonded composites, a laboratory trial was conducted on oriented strandboard (OSB). The furnish used for the study was primarily aspen strands with birch, red pine, and balsam polar mixed in. The isocyanate resin used for the study was a product sold under the trademark "Mondur 541" by the Bayer corporation. The "Archer #1" conjugated linseed oil coadhesive system was supplied by the Archer Daniels Midland Company. The blending parameters were as follows:

75 lbs, oven-dry, of the furnish was loaded in a batch type blender.

Blender speed was 16 rpm.

Total resin addition was 2.45%. This resin was comprised of 70% MDI adhesive and 30% of the "Archer #1" co-adhesive system.

Resin feed rate was 1.5 minutes trough a coil spinning disc atomizer rotating at 13,000 rpm.

Wax emulsion was applied at an addition level of 1.0% with a feed rate of 1.0 minutes trough the coil spinning disc atomizer rotating at 12,000 rpm.

Total dwell time of the furnish in the blender was 3.5 minutes.

The pressing of the experimental panels was on a 2-foot by 2-foot laboratory hot press. The target density of the panels was 39 lbs/cu.ft. with a target thickness of $7/16$-inches. The panel were pressed to the press stops. Randomized mats were produced for this study prior to pressing.

Pressing parameters were as follows:

Platen temperature 205° C.

Press cycle:
Press to stops at 550 psi in 35 seconds, hold pressure for 1.0 minutes
Reduce pressure to 250 psi; cook for 3.5 minutes
Reduce to 0 psi in order to degas the panel
Open press at 4.0 minutes.

The caul sheets employed during this study were well worn, used, aluminum caul sheets. One pair of caul sheets were used throughout the study to maximize the number of releases. The backs of the caul sheets were marked to ensure that the same surface was used for each press cycle. Prior to pressing, the two caul sheets were cleaned and wiped down with acetone to remove any oils or residues that might have interfered with the study. The caul sheets were allowed to dry and flash off 30 minutes prior to use. A caul sheets was used on both the top and bottom surfaces the mat to guard against sticking to the actual press platens.

The laid-up mats were pressed with this one set of caul sheets by using the cycle indicated above. Then the sheets were allowed to cool prior to repeating the procedure of mat lay-up and pressing of the composite panel. A total of 10 repetitions of the procedure were done for this study.

A total of ten panels were produced for this study. After each press load, the panel and caul sheets easily separated from each other. There was no indication of any sticking of the panel to the caul sheets even after 10 cycles. Ten good releases were achieved from both the top and bottom caul sheet. No adverse effects were identified either during the blending or pressing of the oriented strandboard.

Example Test Results

Panels were pressed on a 21×21 inch lab press. Panels were formed homogeneously, panel density was targeted at 39 lbs/cu.ft. oven dry basis. Platen temperatures were 193° C.

TABLE I

ASPEN ORIENTED STRANDBOARD PREPARED USING "ARCHER # 1 CO-ADHESIVE"
Resin Content = 2.1%    Moisture Content = 4.0%    Wax Content-1.0%

| | |
|---|---|
| GROUP 1. | 100% Isocyanate resin |
| GROUP 2. | 85% Isocyanate resin 15% ARCHER # 1 |
| GROUP 3. | 75% Isocyanate resin 25% ARCHER # 1 |
| GROUP 4. | 60% Isocyanate resin 40% ARCHER # 1 |
| GROUP 5. | 50% Isocyanate resin 50% ARCHER # 1 |

TABLE I-continued

| | Test Results: | | | | |
|---|---|---|---|---|---|
| | MOR | MOE | IB | WA | TS |
| Group 1. | 3,004 psi | 530,495 psi | 50,8 psi | 30.7% | 22.9% |
| Group 2. | 3,266 psi | 560,644 psi | 54.0 psi | 29.4% | 27.4% |
| Group 3. | 2,844 psi | 538,540 psi | 57.3 psi | 29.6% | 20.8% |
| Group 4. | 3,180 psi | 604,379 psi | 57.6 psi | 22.3% | 22.3% |
| Group 5. | 2,660 psi | 613,181 psi | 49.1 psi | 26.4% | 26.7% | where:

MOR is Modulus of Rupture

MOE is Modulus of Elasticity

IB is Internal Bonding Strength

WA is Water Absorption

TS is Thickness Swell

What is claimed:

1. A method of making composite boards of agricultural or wood fibers, said method comprising the steps of:
   (a) preparing a bonding material comprising a fast setting resin which sets up fast combined with a slow setting resin which penetrates said fibers, said slow setting resin comprising a conjugated drying oil co-adhesive agent;
   (b) blending said fibers with the bonding material of step (a);
   (c) forming the blended of step (b) fibers into a mat; and
   (d) subjecting the mat of step (c) to pressure and temperature in order to form a composite panel, wherein step (d) comprises the further steps of (d) (1) initially subjecting the mat to a high temperature in a press and high pressure for a period of time; (d) (2) terminating said high temperature while holding said high pressure for a first extended period of time; (d) (3) reducing said high pressure and cooking said mat for a second extended period of time; (d) (4) reducing said pressure to zero and terminating said cooking for a third extended time period long enough to de-gas said mat; and (d) (5) opening said press at the end of said third extended time period.

2. The method of claim 1 further comprising the sub-steps in step (d) (1) wherein about the high temperature is about 220° C., the high pressure is about 550 psi, and the period of time is about 35 seconds; in step (d) (2) the first extended period of time is about one minute; in step (d) (3) the reduced high pressure is about 250 psi and said second extended period of time is about 3.5 minutes; and in step (d) (4) the third extended time period is about a half minute.

3. The method of claim 1 wherein said slow setting conjugated drying oil of step (a) is linseed oil reacted in the absence of oxygen with ruthenium at a reaction temperature of about 180 °C. in the pressure of formic acid, said conjugation of said oil being measured by a disappearance of linolenic and linoleic acid.

4. The method of claim 3 wherein said ruthenium is selected from a group consisting of dodecacarbonyl triruthenium, dichlorotris (triphenylphosphene) ruthenium (II), ruthenium (III) 2,4-pentanedionate, and ruthenium (III) chloride hydrate.

5. The method of claim 3 wherein said ruthenium is ruthenium III chloride hydrate assay of 41.0% Ru.

6. The method of claim 3 wherein said fast setting resin is selected from a group consisting of monomeric diisocyanate, urea-, phenol, melamine -urea, and melamine-formaldehyde, phenolic resin, and polymeric isocyanate.

7. The method of claim 1 wherein said fast setting resin is monomeric diisocyanate.

8. The method of claim 1 wherein said blending of step (b) comprises a loading of wood strands into a rotating blender with said bonding material of step (a) being added via a coil spinning disc atomizer or air atomization at ambient temperature.

9. The method of claim 1 wherein said mat is made of oriented strands wherein succeeding layers of said strands lie perpendicularly to their neighboring layers.

10. A product made by the method of one of the claims 1–9.

11. A method of making a composite board selected from a group consisting of a particle board, plywood, oriented strand board, medium density fiberboard, hardboard, structural strand lumber, said method comprising the steps of:
   (a) placing a strand form of an agricultural or wood fiber in a rotatable blender;
   (b) spray an atomized adhesive into said blender, said adhesive being a mixture of fast setting resin material in combination with a slow setting conjugated drying oil rebase agent, said resin comprising monomeric diisocyanate and said conjugated drying oil being linseed oil treated with ruthenium in the absence of oxygen and the presence of formic acid, said conjugated drying oil having a viscosity range which make it pourable and sprayable at ambient temperatures;
   (c) forming the fiber of step (a) combined with the adhesive of step (b) into a mat according to the fiber arrangement in said selected composite boards by moving said fiber of step (a) through an orienter which places said fibers in an orientation according to said fiber arrangement;
   said fiber arrangement being formed in successive layers, the fibers in each layer being aligned in a direction which is perpendicular to the fibers in its neighbor layers; and
   (d) subjecting said mat of step (c) to a heat and pressure schedule within a press for a period of time; wherein step (d) comprises the further steps of (d) (1) initially subjecting the mat to a high pressure and high temperature for a period of time; (d) (2) terminating said high temperature while holding said high pressure for a first extended period of time: (d) (3) reducing said high pressure and cooking said mat for a second extended period of time; (d) (4) reducing said pressure to zero and terminating said cooking for a third extended time period long enough to de-gas said mat: (d) (5) opening said press at the end of said third extended time period: and (d) (6) removing said mat from said press after completion of said heat and pressure schedule.

* * * * *